United States Patent [19]
Rupprecht

[11] 4,232,766
[45] Nov. 11, 1980

[54] SELF-ADJUSTING DRUM BRAKE

[75] Inventor: Kurt Rupprecht, Wolfsburg, Fed. Rep. of Germany

[73] Assignee: Volkswagenwerk Aktiengesellschaft, Wolfsburg, Fed. Rep. of Germany

[21] Appl. No.: 838,921

[22] Filed: Oct. 3, 1977

[30] Foreign Application Priority Data

Oct. 2, 1976 [DE] Fed. Rep. of Germany ....... 2644575

[51] Int. Cl.² ............................................. F16D 65/52
[52] U.S. Cl. ........................... 188/79.5 P; 188/196 C; 188/196 P
[58] Field of Search ................... 188/79.5 R, 79.5 GC, 188/79.5 M, 79.5 P, 196 R, 196 C, 196 P, 196 V

[56] References Cited

U.S. PATENT DOCUMENTS

| | | | |
|---|---|---|---|
| 2,154,082 | 4/1939 | Baker | 188/196 V |
| 2,322,061 | 6/1943 | Schnell | 188/79.5 P |
| 2,465,063 | 3/1949 | Cleveland | 188/196 P |
| 2,620,049 | 12/1952 | Schnell | 188/79.5 M |
| 2,740,499 | 4/1956 | Dear | 188/196 V |
| 3,339,678 | 9/1967 | Burnett | 188/79.5 P |
| 3,762,511 | 10/1973 | Rath et al. | 188/79.5 P |

FOREIGN PATENT DOCUMENTS

| | | | |
|---|---|---|---|
| 1022433 | 1/1958 | Fed. Rep. of Germany | 188/196 V |
| 2010907 | 10/1971 | Fed. Rep. of Germany | 188/79.5 P |
| 2165733 | 7/1973 | Fed. Rep. of Germany | 188/79.5 P |
| 2538328 | 3/1976 | Fed. Rep. of Germany | 188/79.5 R |
| 856384 | 6/1940 | France | 188/79.5 M |
| 1191320 | 5/1970 | United Kingdom | 188/79.5 P |

Primary Examiner—Edward R. Kazenske
Attorney, Agent, or Firm—Spencer & Kaye

[57] ABSTRACT

A drum brake of the inner shoe type has a self-adjusting device which comprises a push rod, one end of which cooperates with a first brake shoe, while the other end cooperates with a second brake shoe with the intermediary of an adjusting wedge, the position of which determines the effective length of the push rod. In the released state of the brake, the brake shoes abut the push rod-and-wedge assembly, whereby an air gap is defined between the brake lining and the drum. A clamping spring urges the push rod and the second brake shoe against the one and the other wedge flank. The wedge angle of the adjusting wedge is so selected that normally no shifting of the wedge occurs. The push rod has an abutting and displacing arrangement which—as soon as the brake shoe travel exceeds, during brake actuation, a basic structurally determined desired air gap—shifts the push rod against the force of the clamping spring and thus loosens the wedge. As a result, the wedge is advanced to a corresponding extent, thus increasing the effective length of the push rod-and-wedge assembly.

5 Claims, 6 Drawing Figures

SELF-ADJUSTING DRUM BRAKE

BACKGROUND OF THE INVENTION

This invention relates to a drum brake of the inner shoe type which is particularly adapted for use in automotive vehicles and which has a mechanical self-adjusting device for reducing an excessive clearance developing between the brake lining and the drum wall. The self-adjusting device extends between the two brake shoes and is operatively connected therewith. The self-adjusting device has a push rod of constant length, one end of which is in engagement with a first brake shoe or with a brake lever which forms part of a parking brake and which is pivotally connected to the first brake shoe. The other end of the push rod is in engagement with the second brake shoe with the intermediary of an adjusting wedge.

Drum brakes of the inner shoe type are in general so dimensioned that in the released state of the brake, the brake linings do not engage the drum wall. The distance between the drum wall and the work face of the lining should be as small as possible to ensure that the brake fluid quantities required for brake actuation are small and the required brake pedal travel remains short. The necessary clearance between the brake lining and the drum wall to ensure a freedom from interference by the brake in the released state is, in drum brakes, measured across the center of the brake parallel to the wheel cylinder and is designated hereafter as "air gap". This air gap continuously increases during the wear of the brake lining as it engages the brake drum during the braking operation and further, the air gap is temporarily increased because of heat expansion of the brake drum. These circumstances cause an increase of the brake pedal travel.

In view of the above, care has to be taken that the brake shoes are adjusted sufficiently early so that a permissible predetermined maximum air gap is not exceeded. In case of a tardy adjustment of the brake, the risks are high that the then still available brake pedal travel is no longer sufficient to effect the required pressing of the brake shoes against the brake drum. Consequently, the required braking effect in crucial moments may not be present. For this reason it is conventional to provide within the drum brake of the inner shoe type, a device which automatically adjusts the brake shoes, so that between the brake lining and the drum wall there will be present at all times an as small an air gap as possible despite the progressive wear of the brake lining.

Mechanical self-adjusting devices of the above-outlined type are known in a wide variety. In addition to the best known devices of this type which have a locking pawl (such as disclosed in British Pat. No. 1,191,320) or a tooth lock (such as disclosed in German Pat. No. 861,211) wherein the effective length of a two-part push rod arranged between the two brake shoes is increased by rotating an adjusting nut by means of a pawl lever engaging into the teeth of the adjusting nut or by means of pulling outwardly a toothed bolt from a toothed sleeve, there are further known adjusting devices (such as disclosed, for example, in German Pat. No. 1,029,243 and German Laid-Open Application (Offenlegungsschrift) No. 2,010,907) in which a push rod of constant length engages, with one end, one of the brake shoes or components thereof and with the other end engages the other brake shoe with the intermediary of an adjusting wedge. The adjustment of the brake shoes is effected in the last-named adjusting devices by causing the wedge to penetrate deeper into the wedge-shaped space between the push rod, on the one hand, and the adjoining brake shoe, on the other hand, as the lining wear increases. The wedge is urged into the wedge-shaped space by a spring device. In these known arrangements one flank of the adjusting wedge is provided with ratchet teeth which cooperate with corresponding ratchet teeth provided on the push rod or the brake shoe. As long as, during the actuation of the brake operating device (wheel cylinder) the relative motion of the brake shoes is smaller than the depth of the ratchet teeth, the adjusting wedge maintains its position unchanged. The toothed adjusting wedge is further moved by the spring device into the wedge-shaped space between the push rod and the brake shoe only when the brake lining is worn to such an extent that upon operating the brake, the above-noted relative motion is greater than the depth of the ratchet teeth (which means that the air gap has increased correspondingly). This advance of the adjusting wedge is of such extent that it corresponds to the width of one or several ratchet teeth. The number of ratchet teeth is dependent upon the number of tooth heights by which the brake shoes have moved away from one another. Similarly to the earlier-mentioned adjusting devices which have a pawl lock or a tooth lock, in the arrangement operating with an adjusting wedge, the brake shoe adjustment is always effected stepwise. This means that similarly, the air gap too, can only be reduced in a stepwise manner. In drum brakes of the inner shoe type which have a brake lever which forms part of a parking brake (hand brake) and which is articulated to one of the brake shoes, the push rod engages the above-noted adjusting device and the brake lever and transmits the operating force, introduced by the brake lever, to the other brake shoe. Upon actuation of the brake lever, generally very high forces are generated which are also effective in the teeth of the adjusting device. Therefore, there is always present some risk that the teeth will be damaged, thus endangering a properly operating self-adjustment of the brake shoes.

There is further known a drum brake (such as disclosed in U.S. Pat. No. 2,322,061), wherein a toothless adjusting wedge is utilized for the mechanical self-adjustment of the air gap. This known wedge-shaped adjusting device has a relatively complicated structure. It has two wedge-shaped components, one of which is situated between the brake shoe and the push rod and varies the effective length of the push rod. In order to displace this wedge-shaped component in the required manner during brake lining wear, there is provided a second wedge-shaped component cooperating with further components. The first wedge-shaped component is pressed against the push rod and the adjacent brake shoe by means of a return spring attached to both brake shoes. This pressing (tensioning) is relaxed (released) upon each braking operation and the first wedge-shaped component is adjusted at times. Thus, as the lining wear increases, the return force of the return spring varies accordingly. The desired air gap in this known drum brake is initially set during installation by means of a special cam plate.

SUMMARY OF THE INVENTION

It is an object of the invention to provide an improved self-adjusting device for drum brakes which is of simplified construction, which avoids the above-discussed disadvantages of prior art arrangements and which is further improved so that without appreciable influence by the shoe return force, a substantially stepless adjustment of the air gap is ensured.

This object and others to become apparent as the specification progresses, are accomplished by the invention, according to which, briefly stated, the self-adjusting device for a drum brake of the inner shoe type comprises a push rod, one end of which cooperates with a first brake shoe, while the other end cooperates with a second brake shoe with the intermediary of an adjusting wedge, the position of which determines the effective length of the push rod. In the released state of the brake, the brake shoes abut the push rod-and-wedge assembly, whereby an air gap is defined between the brake lining and the drum. A clamping spring urges the push rod and the second brake shoe against the one and the other wedge flank. The wedge angle of the adjusting wedge is so selected that normally no shifting of the wedge occurs. The push rod has an abutting and displacing arrangement which—as soon as the brake shoe travel exceeds, during brake actuation, a basic, structurally determined desired air gap—shifts the push rod against the force of the clamping spring and thus loosens the wedge. As a result, the wedge is advanced to a corresponding extent, thus increasing the effective length of the push rod-and-wedge assembly.

The invention thus takes advantage of the recognition that a toothless wedge is self-locking if the ratio of the wedge angle to the friction coefficient between the wedge faces and the respective engagement faces has a certain predetermined value.

Compared to adjusting devices wherein toothed setting members are used, the invention is advantageous in that a stepless adjustment of the air gap is achieved and upon operating the parking brake lever, damages to the adjusting wedge, which could lead to an adverse effect on the air gap compensation are securely avoided since rust and fragments (for example, from the brake drum or the lining) can no longer settle as they could between the wedge teeth of prior art arrangements. It is of further advantage that the brake shoe, the adjusting wedge and the push rod remain firmly pressed to one another under the effect of a separate clamping spring even during the operation of the brake and only upon the appearance of an excessively large air gap are they rendered loose with respect to one another to such an extent that the adjusting wedge is allowed to be shifted. Further, a significant advantage of the invention resides in the fact that the air gap in the drum brake according to the invention need not be set during installation; such setting is effected automatically upon the first application (operation) of the brake. Apart from the fact that in this manner there is achieved a reduction of structural expenses as well as installation costs for the drum brakes, the danger of faulty settings of the air gap during installation is wholly eliminated.

DESCRIPTION OF THE PREFERRED EMBODIMENTS

Figure 1:
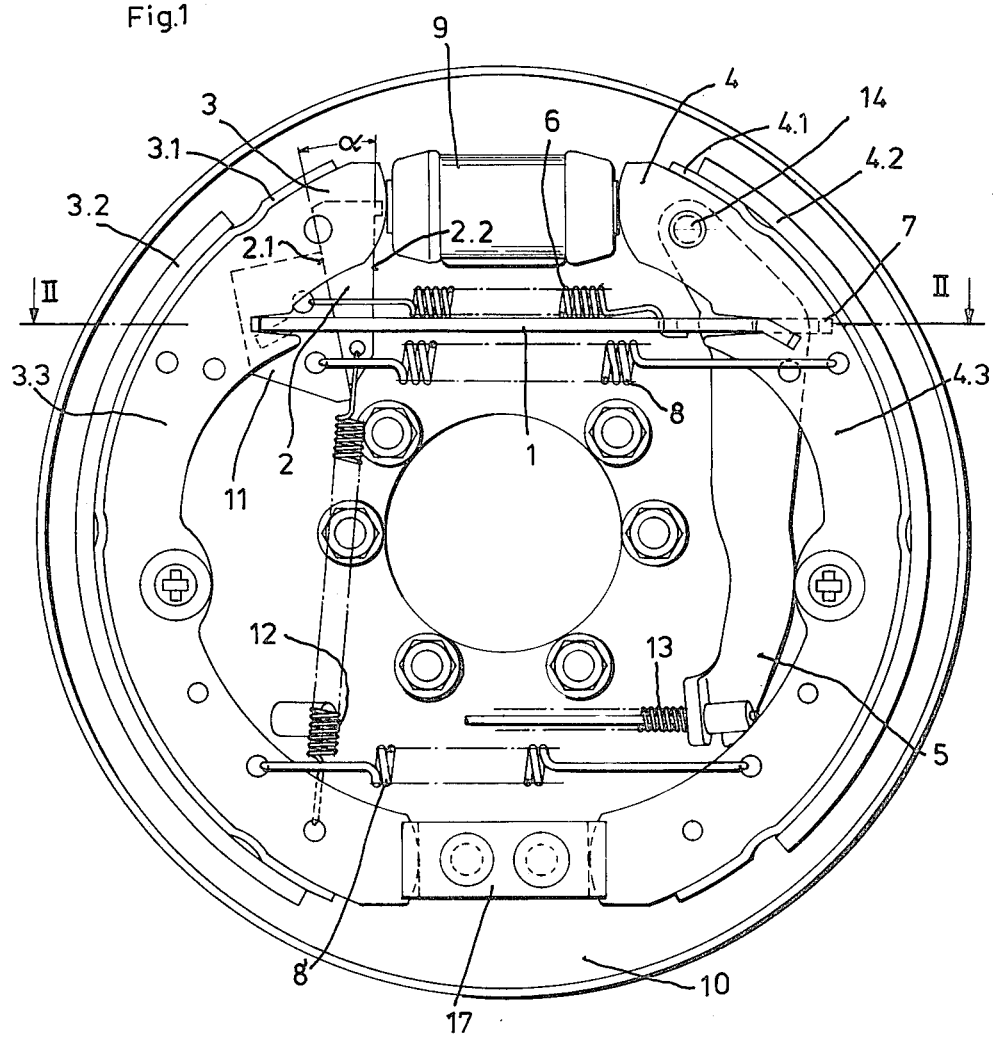
FIG. 1 is an elevational view of the inside of a brake drum of the inner shoe type incorporating a preferred embodiment of the invention.
Figure 2:
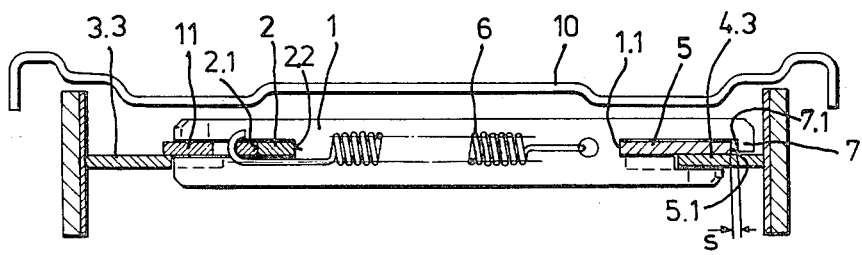
FIG. 2 is a sectional view taken along line II—II of FIG. 1.

Turning now to FIGS. 1 and 2, there is shown a drum brake comprising two brake shoes 3 and 4 arranged within the brake drum. The brake shoes conventionally have a T-shaped cross section. The cross member or flange 3.1 and, respectively, 4.1 of the "T" of the brake shoes is oriented towards the brake drum and is provided with a respective lining 3.2 and 4.2. The center leg or web of the "T" is designated at 3.3 and 4.3 for the two brake shoes 3 and 4, respectively. The heels (lower ends) of the brake shoes 3 and 4 engage, with their arcuate engagement faces, a support member 17. The toes (upper ends) of the brake shoes 3 and 4 are connected with a brake operating device 9 which is situated in the upper part of the drum brake and which is constituted by a hydraulic wheel cylinder. The brake operating device 9 transmits to the brake shoes 3 and 4, during brake actuation, a braking force, whereupon the brake shoes are forced by the brake operating device 9 outwardly to cause engagement of the linings 3.2 and 3.4 with the drum. Upon release of the brake, the brake shoes 3 and 4 are, by means of return springs 8 and 8', pulled away from the brake drum towards one another into the released state until the brake shoes arrive into abutting engagement with a push rod 1 which is arranged underneath the brake operating device 9 and which extends between the two brake shoes 3 and 4. The length of the path traveled by each brake shoe from its applied state (braking state) into its released state is defined as the "air gap" of the drum brake. The one-piece push rod of constant length constitutes a component of a mechanical self-adjusting device for eliminating the air gap excess developing, for example, due to lining wear.

As viewed in FIG. 2, the right-hand end of the push rod 1, more particularly, an edge face 1.1 thereof, is in an abutting relationship with a brake lever 5 in the released state of the brake. The brake lever 5 forms part of a parking brake (hand brake) and is articulated by means of a pivot 14 to the brake shoe 4. The left-hand end of the push rod 1 engages the left-hand brake shoe 3 indirectly, with the intermediary of a toothless adjusting wedge 2 having wedge flanks 2.1 and 2.2 defining the wedge angle $\alpha$. To the web 3.3 of the brake shoe 3, there is affixed a support plate 11 which serves to abut the flank 2.1 of the adjusting wedge 2. The wedge angle $\alpha$ is dimensioned by taking into consideration the frictional values between the wedge flank 2.1 and the support plate 11 as well as between the wedge flank 2.2 and the push rod 1. The magnitude of the wedge angle $\alpha$ is so selected that a self-locking arrangement will result (that is, the wedge 2 will not slip outwardly in response to pinching forces exerted thereon by the push rod 1 and the plate 11). It is known that a self-locking phenomenon in such a wedge arrangement will be present if the wedge angle $\alpha$ is smaller than or identical to twice the value of the friction angle $\rho_0$ (assuming the identical friction angle $\rho_0$ for the two effective wedge flanks 2.1 and 2.2). In this connection reference is made to Dubbel: Taschenbuch für den Maschinenbau (Handbook for Mechanical Engineers), Vol. 1, 1961, pages 218–221. As a complementation it is noted that the friction angle $\rho_0$ is obtained from the formula $\mu_0 = \tan \rho_0$. The frictional coefficient $\mu_0$ is a function of the surface as well as the material pair constituting the interfaces. In case of a material pair of steel-steel, $\mu_0$ may be considered as being approximately 0.1 which would correspond to a friction angle $\rho_0 = 6°$. The wedge angle $\alpha$ would, based on these assumptions, be selected at approximately 12°.

The adjusting wedge 2 is firmly pressed together with the push rod 1 as well as the brake shoe 3 or, more precisely, with the support plate 11 attached thereto, by means of a clamping spring 6. The clamping spring 6, which is constituted by a tension coil spring, hooks, with one end, into an opening provided in the push rod 1 and with its other other end, into an opening provided in the support plate 11. In the released state of the brake (that is, during periods when the brake operating device 9 is not actuated), thus, when the two brake linings 3.2 and 4.2 are spaced from the brake drum, the pressing effect of the clamping spring 6 is aided by the force of the return spring 8 which, at one end, is hooked into an opening of the support plate 11 and, at the other end, is hooked into an aperture provided in the brake shoe 4. The wedge angle $\alpha$ of the adjusting wedge 2, the friction value of the wedge connection (that is, the friction value between the wedge flank 2.1 and the support plate 11 as well as between the wedge flank 2.2 and the push rod 1), the clamping spring 6 and the return spring 8 are so designed with respect to their dimensions and their mutual spatial arrangement that the forces acting on the adjusting wedge 2 are in equilibrium. The adjusting wedge 2 thus maintains its position unchanged. Stated differently, the adjusting wedge 2 can neither penetrate further into the wedge-shaped space between the push rod 1 and the support plate 11 nor can it slip outwardly therefrom. This circumstance applies even when the parking brake, that is, the brake lever 5 swingably arranged by the pivot pin 14 is actuated and exerts a large force through the push rod 1 on the wedge connection 2, 1, 11. In the released state of the parking brake the brake lever 5 is pressed counterclockwise against the right-hand brake shoe 4 by means of a compression spring 13 which is arranged on the hand brake operating cable (not shown). In this manner the brake lever 5 is immobilized in its position. As may be seen from FIG. 2, in the non-actuated state of the brake operating device 9, the brake lever 5 lies against the push rod 1 under the effect of the return spring 8 which exerts a force on the brake lever 5 through the brake shoe 4. Thus, the magnitude of the air gap is limited by the effective length of the push rod 1, that is, by the constant length of the push rod plus the effective thickness of the adjusting wedge 2, since the two brake shoes 3 and 4 can be pulled away from the drum only to such an extent until they arrive into abutting engagement with the push rod-and-wedge assembly.

At that end of the push rod 1 which is remote from the adjusting wedge 2 there is provided an abutting and displacing arrangement which, in the embodiment shown, is constituted by a hook-like portion (continuation) 7 of the push rod 1. As may be well observed in FIG. 2, the hook-like portion 7 bends around an edge 5.1 of the brake lever 5. In the non-actuated state of the brake operating device 9 there prevails a clearance $s$ between the edge 5.1 of the brake lever 5 and an inner edge 7.1 of the hook-like portion 7. To the clearance $s$—by virtue of its dimensioning—there corresponds a structurally determined basic air gap which is measured across the drum middle parallel to the wheel cylinder 9 and which is somewhat larger than the expansion of the brake drum occurring at maximum brake heat up.

Upon actuation of the brake operating device 9, the brake shoes 3 and 4 are pressed away from one another against the force of the return springs 8 and 8'. During this motion the brake shoes 3 and 4 execute a swinging motion practically about the support 17. By virtue of the separating motion of the two brake shoes 3 and 4, the brake lever 5 immobilized by the compression spring 13 on the brake shoe 4 is lifted off the abutment face 1.1, whereby the clearance $s$ between the hook-like portion 7 of the push rod 1 and the brake lever 5 decreases. During this phase of the separating movement of the two brake shoes 3 and 4, the clamped arrangement of the adjusting wedge 2 with the push rod 1 and the support plate 11 remains unaffected; these components are still firmly held together by the clamping spring 6.

Only when the displacement of the brake shoes exceeds, because of brake lining wear and/or brake drum expansion due to heat, the structurally determined basic air gap (determined by the clearance $s$) and thus the brake lever 5 arrives into engagement with the hook-like portion 7 of the push rod 1, is the push rod lifted off the flank 2.2 of the adjusting wedge 2 against the force of the clamping spring 6. This occurrence dissolves the clamping arrangement between the adjusting wedge, push rod and support plate. The adjusting wedge then can, under the effect of an adjusting spring 12 which exerts a force thereon, further penetrate in the increasing wedge-shaped space between the push rod 1 and the support plate 11 until it again engages both the push rod 1 and the support plate 11, whereby an adjustment of the air gap has been achieved. It will thus be recognized that with the above-mentioned dimensioning of the clearance $s$, an adjustment of the air gap by displacing the adjusting wedge 2 can occur only if the sum formed of the brake lining wear and the heat-caused drum expansion is greater than the structurally determined air gap corresponding to the clearance $s$. The actual air gap which exists during service between the brake shoes and the brake drum and which is measured across the drum middle is thus subject to fluctuations in time, as a function of wear and temperature conditions.

Figure 4:
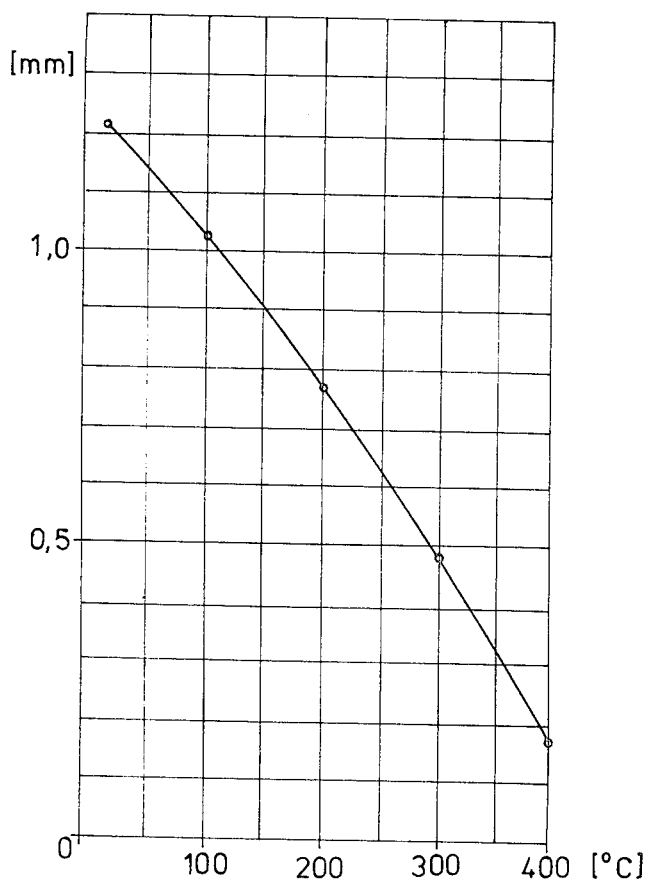
FIG. 4 is a diagram illustrating the air gap magnitude as a function of brake temperature.

FIG. 4 shows a diagram for illustrating the above-noted relationships. The curve characterizes the air gap of the cold brake subsequent to an actuation of the brake as a function of the brake drum temperature during that braking operation. The lining wear was assumed to have remained the same throughout. It is noted that the given numerical values relate only to a particular brake type which was subject to the tests. It will be recognized from the diagram that the residual air gap of the released brake in its cooled state is the smallest when the operation of the brake actuating device has taken place at a maximum heated brake and that the value is the largest when the brake operation has taken place practically in a cold state of the brake.

Figure 3:
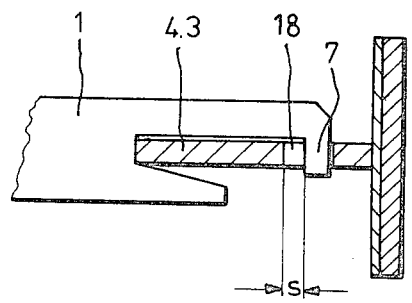
FIG. 3 is a modified detail of the structure shown in FIG. 2.

In the embodiment illustrated in FIGS. 1 and 2, the push rod 1 engages the brake lever 5 which is articulated to the brake shoe 4 and which forms part of the parking brake. The self-adjusting device according to the invention can be readily used in drum brakes of the inner shoe type which have no brake lever. In such a case the push rod engages directly the web of the brake shoe 4 and engages—as shown in FIG. 3 in an exemplary manner—with its hook-like portion 7 into a longitudinal opening 18 provided in the web. The opening 18 is so dimensioned that a clearance s is obtained which determines the desired basic air gap.

In the embodiment shown in FIG. 1, the adjusting spring 12 engaging the adjusting wedge 2 is a tension spring. It is to be understood that the same spring effect may be achieved, for example, by a compression spring which engages the wider portion of the adjusting wedge.

It is further to be understood that the effect sought for can also be achieved, as a departure from the arrangement shown in FIG. 1, with an upwardly tapering wedge which is urged by a spring device upwardly from below. Such a variant may be under certain circumstances of advantage if space saving is a consideration.

If the adjusting wedge 2 is installed in the position shown in FIG. 1, the adjusting spring 12 may be under certain circumstances omitted because the adjusting wedge, as the push rod 1 is moved away therefrom, is urged downwardly by virtue of its own weight and because, on the other hand, an upward wandering during normal operation is prevented by the self-locking effect of the adjusting wedge. Taking into consideration the fact that drum brakes of the inner shoe type are, during normal service, exposed to sharp jars, vibrations and substantial heavy soiling, it is nevertheless of advantage to utilize the adjusting spring 12 as illustrated in FIG. 1.

Figure 6:
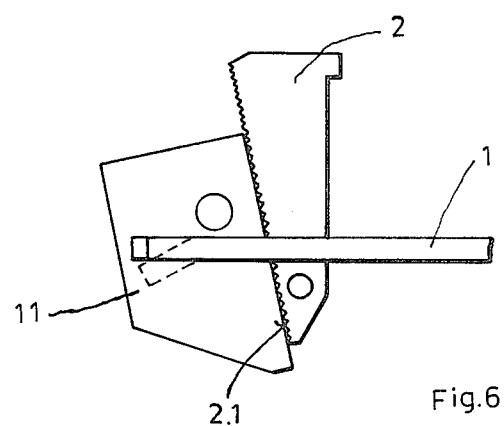
FIG. 6 is a modified detail of the wedge structure shown in FIG. 1.

In order to achieve a high friction value between the interfaces of the adjusting wedge and the adjacent components, it may be of advantage to roughen at least one of these surfaces artificially by providing, for example, a knurling of such surface as shown in FIG. 6, for example. As a rule, however, the surface coarseness of these edge faces resulting from the stamping of the components should be generally be sufficient.

Figure 5:
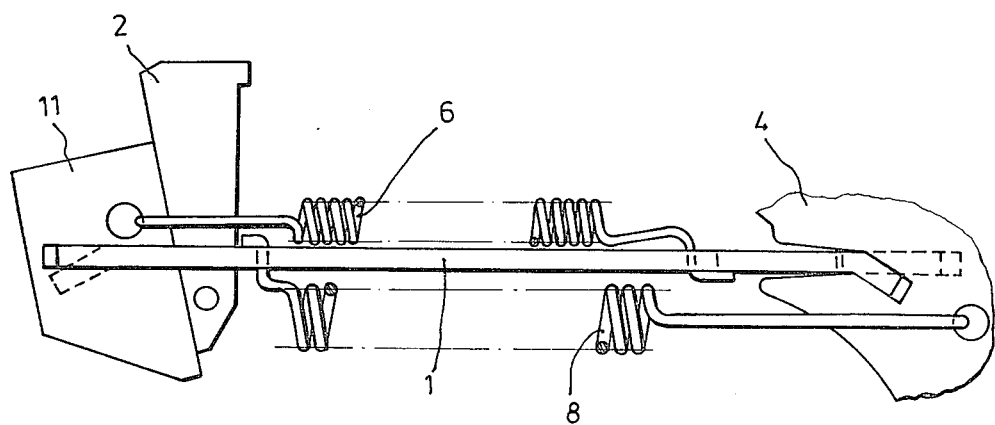
FIG. 5 is a modified detail of the push-rod structure shown in FIG. 3.

In the embodiment illustrated in FIGS. 1 and 2, the return spring 8 which is effective in the upper zone (toe zone) of the brake shoes), engages the two brake shoes 4 and 3 or, as the case may be, the support plate 11 attached to the brake shoe 3. As a departure from the described embodiment, it is further feasible to secure the clamping spring 6 with its one end to the push rod as shown and with its other end to the brake shoe 3 oriented towards the adjusting wedge and further, to secure the parallel-arranged return spring 8 with its one end also to the push rod 1 and with its other end to the brake shoe 4 which is oriented away from the adjusting wedge as shown in FIG. 5, for example. The return force affecting the two brake shoes 3 and 4 is then the spring force resulting from the series connection of the of the two springs. This arrangement has the significant advantage that the magnitude of the effective return spring force remains practically unchanged throughout the entire life of the brake lining and the spring path of the return springs remains small. It is a precondition in this arrangement that the spring force of the clamping spring 6 is significantly greater than that of the return spring in order to ensure that during normal brake actuation the adjusting wedge is maintained in a clamped state. In such an arrangement, the brake pedal force and the brake pressure generated thereby remain practically constant throughout the life of the brake lining which is to be regarded as a further significant advantage.

The mechanical self-adjusting device according to the invention has a notably simple structure which is operationally safe regarding soiling and vibrations during service. Particularly, due to the absence of ratchet teeth or other tooth-like structures it is particularly robust and immune to operational malfunctions. It further has the significant advantage that it effects a stepless adjustment of the air gap. Further, a manual initial setting during installation is not required, since during the course of the first actuation of the brake operating device, the brake automatically sets itself to the structurally determined air gap.

It will understood that the above description of the present invention is susceptible to various modifications, changes and adaptations and the same are intended to be comprehended within the meaning and range of equivalents of the appended claims.

What is claimed is:

1. In a drum brake having a drum; first and second brake shoes arranged within the drum and provided with a brake lining oriented towards a drum face; a brake lever forming part of a parking brake and pivotally attached to the first brake shoe; return spring means continuously urging the brake shoes away from the drum face; a brake operating device having an actuated state in which the brake shoes are pressed, against the force of the return spring means, into frictional engagement with the drum face; the brake operating device having a released state in which an air gap is maintained between the lining of each brake shoe and the drum face; and a self-adjusting device operatively coupled to the brake shoes for automatically maintaining the air gap at a desired maximum value, the improvement in said self-adjusting device comprising (a) a push rod of fixed length having opposite first and second ends; said return spring means urging said brake lever into operative abutment with said push rod at said first end thereof;

(b) an adjusting wedge having
  (1) a first flank frictionally cooperating with a component forming a fixed part of said second brake shoe;
  (2) a second flank frictionally cooperating with said push rod at said second end thereof; said return spring means urging said second brake shoe into operative abutment with said push rod with the intermediary of said adjusting wedge; said component of said second brake shoe and said push rod together defining a wedging space occupied by said adjusting wedge;
  (3) a wedge angle defined by the inclination of said first and second flanks to one another; said wedge angle being of a magnitude to effect self-locking of said wedge when frictionally engaged by said component of said second brake shoe and said push rod;

(c) a clamping spring being attached, at one end, to said second brake shoe and further being attached, at another end, directly to said push rod for pressing said component of said second brake shoe and said push rod into frictional engagement with said first and second flanks, respectively, of said adjusting wedge separately from the effect of said return spring means; the magnitude of said wedge angle, the friction coefficient between said first flank and said component forming a fixed part of said second brake shoe and the friction coefficient between said second flank and said push rod as well as the forces of said return spring means and said clamping spring being so selected as to effect an equilibrium between the forces normally exerted on said adjusting wedge; and (d) an abutting and displacing means comprising a hook-like portion formed at said first end of said push rod; said hook-like portion projecting behind a part of said brake lever; said part of said brake lever being arranged to move towards said hook-like portion as said first brake shoe moves towards said drum face upon actuation of said brake operating device; in said released state said part of said brake lever and said hook-like portion define, between themselves, a clearance being identical to and determining said desired maximum value; said hook-like portion being arranged for transmitting to said push rod a displacing force derived from the travel of said brake shoes towards said drum face upon actuation of said brake operating device solely after said travel has exceeded the magnitude of said desired maximum value; said push rod being arranged to shift with respect to said component of said second brake shoe against the force of said clamping spring in response to said displacing force for dissolving said equilibrium and increasing said wedging space for allowing said wedge to shift and take up the increased wedging space.

2. A drum brake as defined in claim 1, further comprising a wedging spring connected to said adjusting wedge and urging said adjusting wedge into said wedging space.

3. A drum brake as defined in claim 1, wherein said component of said second brake shoe is a support plate affixed to a web part of said second brake shoe.

4. A drum brake as defined in claim 1, wherein said clamping spring is a tension spring; said return spring means comprising a return spring having one end attached to said push rod and having another end attached to said first brake shoe.

5. A drum brake as defined in claim 1, wherein at least one of said flanks of said adjusting wedge is knurled for increasing the friction value thereof.

* * * * *